(12) United States Patent
Hino (10) Patent No.: US 8,100,810 B2
(45) Date of Patent: Jan. 24, 2012

(54) BICYCLE INTERNAL HUB TRANSMISSION WITH HELICAL GEAR

(75) Inventor: Tetsuya Hino, Osaka (JP)

(73) Assignee: Shimano Inc., Osaka (JP)

( * ) Notice: Subject to any disclaimer, the term of this patent is extended or adjusted under 35 U.S.C. 154(b) by 1060 days.

(21) Appl. No.: 11/966,094

(22) Filed: Dec. 28, 2007

(65) Prior Publication Data

US 2009/0170654 A1    Jul. 2, 2009

(51) Int. Cl.
*F16H 57/08* (2006.01)

(52) U.S. Cl. ........................................ 475/344

(58) Field of Classification Search .................. 475/344, 475/348
See application file for complete search history.

(56) References Cited

U.S. PATENT DOCUMENTS

| | | | |
|---|---|---|---|
| 3,351,165 A | 11/1967 | Shimano | |
| 5,222,412 A | 6/1993 | Nagano | |
| 5,882,274 A | 3/1999 | Shoge | |
| 5,928,103 A | 7/1999 | Shoge | |
| 5,964,678 A | 10/1999 | Hanada et al. | |
| 5,964,679 A | 10/1999 | Matsuo et al. | |
| 6,179,743 B1 * | 1/2001 | Morrow | 475/219 |
| 6,607,465 B1 | 8/2003 | Shoge | |
| 7,083,542 B2 | 8/2006 | Itou et al. | |
| 2003/0017905 A1 * | 1/2003 | Butz | 475/296 |
| 2007/0049453 A1 | 3/2007 | Nagai et al. | |

FOREIGN PATENT DOCUMENTS

| | | |
|---|---|---|
| GB | 29101 | 12/1913 |
| JP | S41-5169 B | 3/1966 |
| JP | S61-82050 A | 4/1986 |
| JP | H10-310093 A | 11/1998 |
| JP | H11-171080 A | 6/1999 |
| JP | 2000-43780 A | 2/2000 |
| JP | 2002-235833 A | 8/2002 |
| WO | WO-2006/033541 A1 | 3/2006 |

OTHER PUBLICATIONS

Japanese Office Action issued on Jan. 18, 2011 for corresponding Japanese Application No. JP-A-2008-323211.

* cited by examiner

*Primary Examiner* — Edwin A Young
(74) *Attorney, Agent, or Firm* — Global IP Counselors, LLP (57) ABSTRACT

An internal hub transmission includes a hub axle, a driver rotatably supported by the hub axle, a hub shell rotatably supported by the hub axle, a power transmission mechanism and a shift mechanism. The power transmission mechanism is disposed between the driver and the hub shell for transmitting rotational power from the driver to the hub shell through a plurality of power transmission paths. The power transmission mechanism has at least one planetary gear mechanism that includes a sun gear, a planetary gear and a gear ring. The planetary gear is supported by a gear rack. The planetary gear has helical gear teeth and at least one of the sun gear and the gear ring is provided with helical gear teeth that mesh to helical gear teeth of the planetary gear.

20 Claims, 11 Drawing Sheets

BICYCLE INTERNAL HUB TRANSMISSION WITH HELICAL GEAR

BACKGROUND OF THE INVENTION

1. Field of the Invention

This invention generally relates to a bicycle internal hub transmission. More specifically, the present invention relates to a bicycle internal hub transmission that includes a planetary gear mechanism.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle internal hub transmission. Internal hub transmissions are popular because all transmission components are concealed within a hub shell and are not visible.

Conventional bicycle internal hub transmissions typically include a planetary gear mechanism. Some bicycle internal hub transmissions include more than one planetary gear mechanism. The planetary gear mechanism typically includes a sun gear with one or more planetary gears engaging and rotating about the sun gear. In conventional planetary gear mechanisms, the sun gear and planetary gear(s) typically have straight gear teeth commonly known as spur gears. A problem with conventional bicycle internal hub transmissions is that as the spur gears can be noisy. A cyclist riding a bicycle with a bicycle internal hub transmission having spur gears can hear such noise and may feel insecure about the operation of the bicycle internal hub transmission even though there is nothing mechanically wrong with the bicycle internal hub transmission.

Also, although spur gears are generally reliable when employed in mechanical devices such as in a bicycle internal hub transmission, the meshing of spur gears has a potential energy transmission inefficiency when used in planetary gear mechanism(s) of a bicycle internal hub transmission.

In view of the above, it will be apparent to those skilled in the art from this disclosure that there exists a need for an improved bicycle internal hub transmission that eliminates such noise during operation and improves efficiency. This invention addresses this need in the art as well as other needs, which will become apparent to those skilled in the art from this disclosure.

SUMMARY OF THE INVENTION

One object of the present invention is to provide a bicycle internal hub transmission with gear teeth that eliminate or reduce unwanted noise typically associated with spur gears.

Another object of the present invention is to provide a bicycle internal hub transmission with smooth and quiet operation.

Still another object of the present invention is to provide a bicycle internal hub transmission with more efficient meshing of gear teeth.

In accordance with one aspect of the present invention, an internal hub transmission includes a hub axle, a driver rotatably supported by the hub axle, a hub shell rotatably supported by the hub axle and a power transmission mechanism. The power transmission mechanism is disposed between the driver and the hub shell for transmitting rotational power from the driver to the hub shell through a plurality of power transmission paths. The power transmission mechanism has at least one planetary gear mechanism that includes a sun gear, a planetary gear and a gear ring. The planetary gear is supported by a gear rack. The planetary gear has helical gear teeth and at least one of the sun gear and the gear ring is provided with helical gear teeth that mesh to helical gear teeth of the planetary gear. The internal hub transmission also includes a shift mechanism for selecting one of the plurality of power transmission paths.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
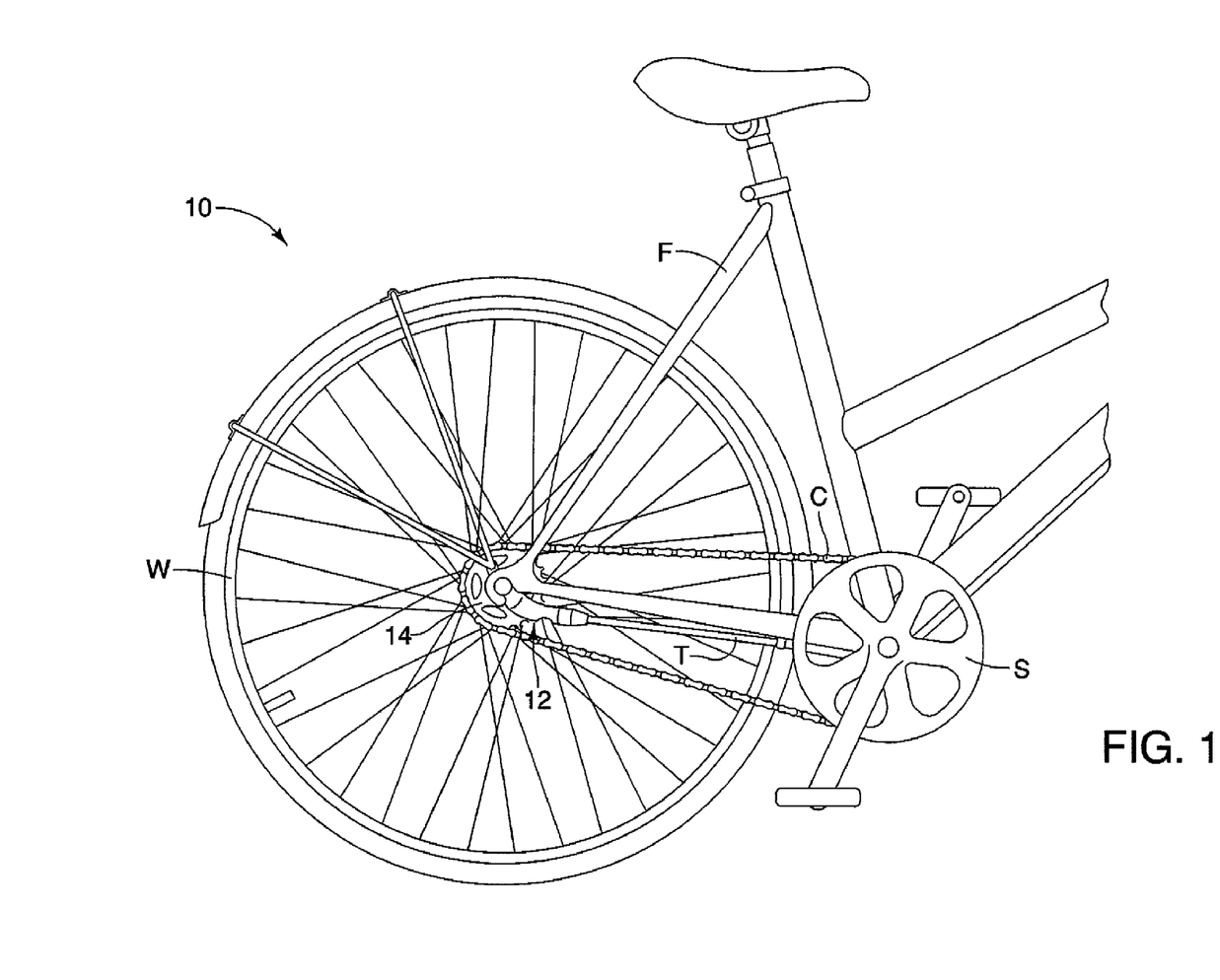
FIG. 1 is a side elevational view of a rear half of a bicycle that includes a internal hub transmission in accordance with the present invention.

Referring initially to FIG. 1, a bicycle 10 that includes a hub assembly 12 is illustrated in accordance with a first embodiment of the present invention. As described below in greater detail, portions of the hub assembly 12 are provided with helical gear teeth to improve performance.

As shown in FIG. 1, the bicycle 10 includes a frame F, a rear wheel W, a front chain sprocket S, a chain C and the hub assembly 12. Although not shown, the bicycle also includes a handlebar with a conventional gear shifter mounted thereon, the conventional gear shifter further connecting to a Bowden type cable T for shifting between power transmission paths, as described in greater detail below. The rear wheel W is rotatably supported by the hub assembly 12 on the frame F. The chain C is configured to transmit rotational power from the front chain sprocket S to a rear chain sprocket 14 in a conventional manner. As is described in greater detail below, the rear chain sprocket 14 is rotatably supported to a portion of the hub assembly 12.

Figure 2:
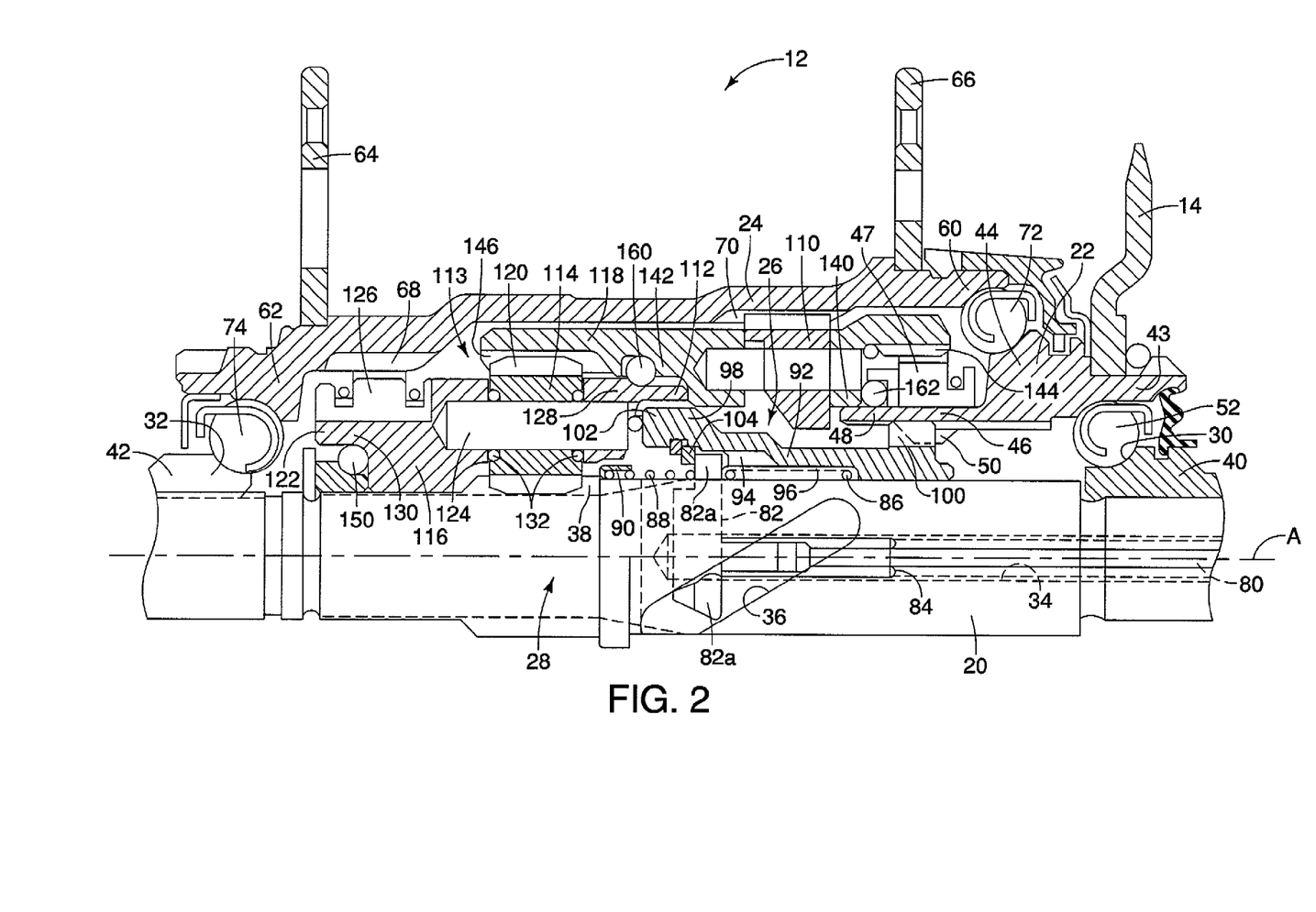
FIG. 2 is a cross-sectional view of the internal hub transmission showing details of a planetary gear mechanism, including a hub shell, a hub axle, a clutch ring, a planet gear carrier and a ring gear in accordance with a first embodiment of the present invention.
Figure 3:
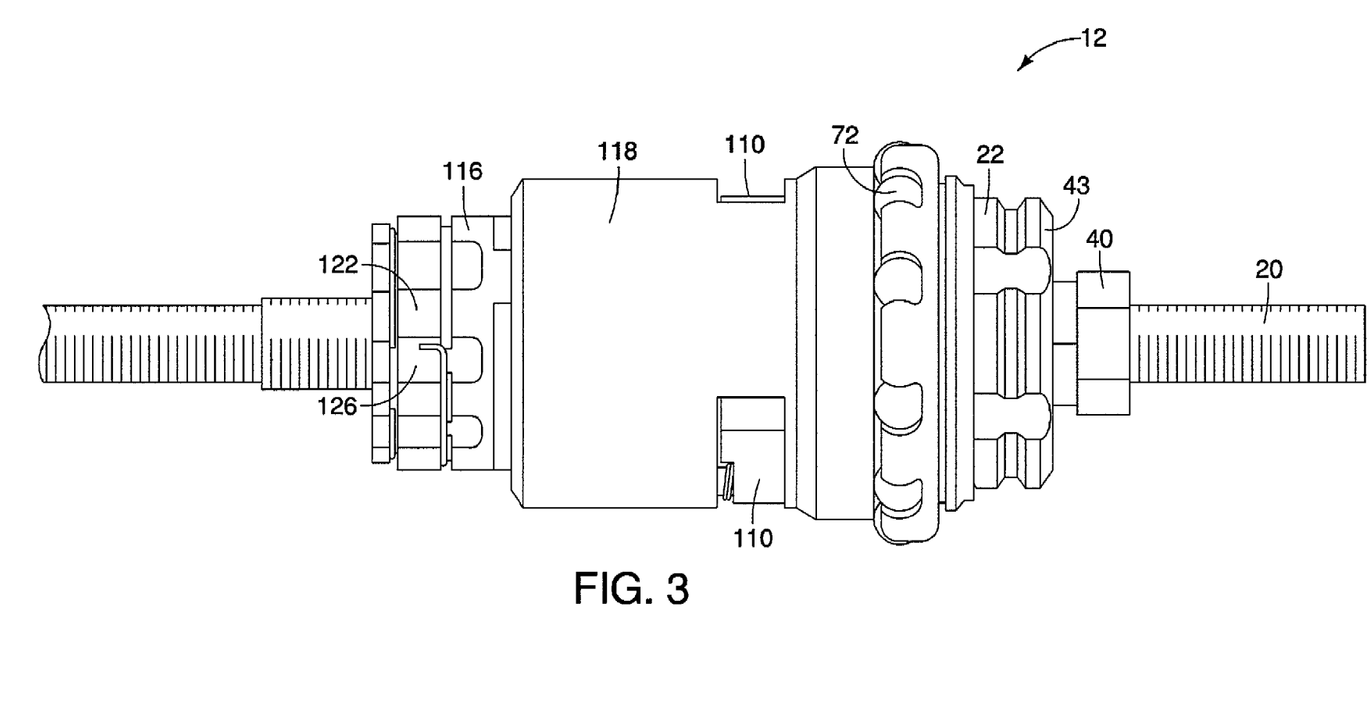
FIG. 3 is a side elevational view of the internal hub transmission with the hub shell removed showing portions of the hub axle, portions of the planet gear carrier and the ring gear in accordance with the first embodiment of the present invention.

As best shown in FIG. 2, the hub assembly 12 basically includes a stationary axle 20 (a hub axle), a driver 22, a hub shell 24, a shifting mechanism 26 and a power transmission mechanism 28.

The stationary axle 20 is an elongated shaft member that has conventional threaded ends for mounting to the bicycle frame F and is preferably made of metal. The stationary axle 20 further defines a rotational axis A with the rear wheel W being rotatable about the rotational axis A. The stationary axle 20 basically includes a first bearing support portion 30, a second bearing support portion 32, a central bore 34, a pair of elongated openings 36 (only one is visible in FIGS. 2 and 4) and sun gear teeth 38.

The first bearing support portion 30 is formed on a removable retaining member 40. The second bearing support portion 32 is also preferably formed on another removable retaining member 42. The central bore 34 extends from one end of the stationary axle 20 to approximately a mid-portion thereof, as indicated in FIG. 2. As described below, the shifting mechanism is at least partially disposed within the central bore 34.

Figure 4:
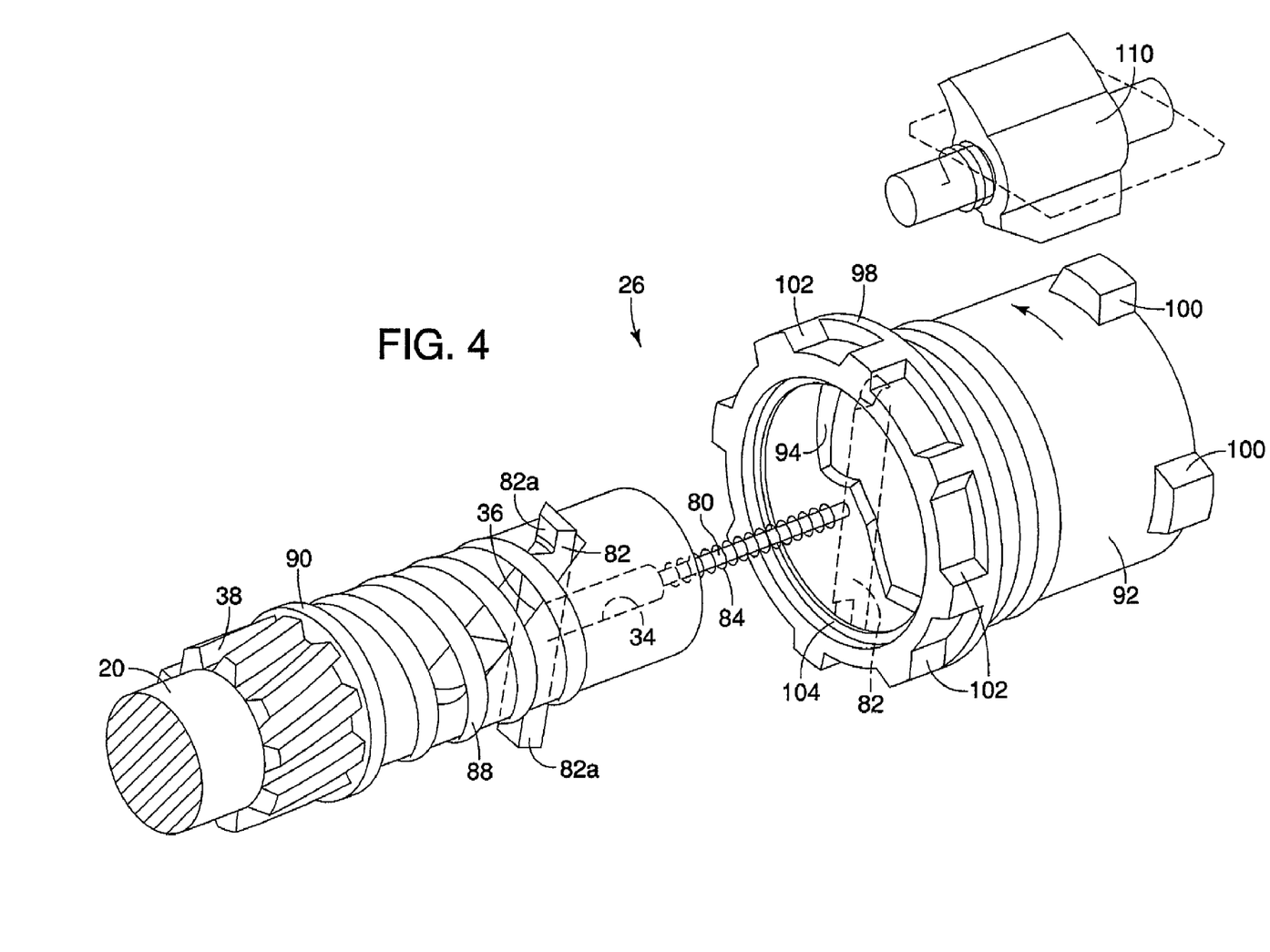
FIG. 4 is a perspective view of the internal hub transmission with the hub shell and ring gear removed showing portions of the hub axle and the clutch ring in accordance with the first embodiment of the present invention.
Figure 5:
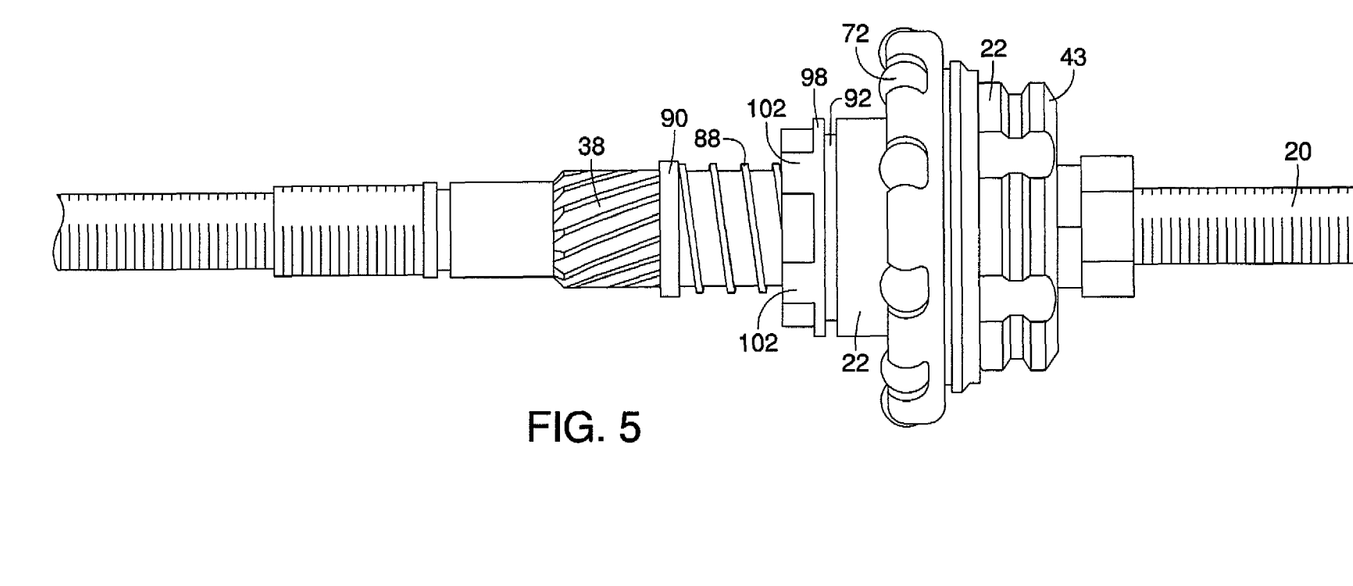
FIG. 5 is a side elevational view of the internal hub transmission similar to FIG. 3 with the hub shell, the ring gear and the planet gear carrier removed showing the hub axle in accordance with the first embodiment of the present invention.

The elongated openings 36 of the stationary axle 20 are open to the central bore 34. As best shown in FIG. 4, the elongated openings 36 are straight but are angularly offset relative to the rotational axis A, thus having a helical shaped appearance. The purpose of the elongated opening 36 and the central bore 34 are explained below along with a description of the shifting mechanism 26.

The sun gear teeth 38 are helical shaped gear teeth, as best shown in FIG. 4. The sun gear teeth 38 are preferably machined into the outer surface of the stationary axle 20. However, it should be understood from the drawings and the description herein that the sun gear teeth 38 can alternatively be formed on a separate annular shaped gear member that is fixed to or otherwise supported on the stationary axle 20.

As best shown in FIG. 2, the driver 22 is an annular member that is rotatably disposed about the stationary axle 20. The rear chain sprocket 14 is rigidly fixed to an outer surface of the driver 22, as shown in FIG. 2. The driver 22 basically includes an inner bearing support portion 43, an outer bearing support portion 44, a pawl support portion 46, a plurality of pawls 47, a ring gear bearing support portion 48 and an inwardly projecting set of gears 50. A first main bearing 52 is disposed between the inner bearing support portion 43 of the driver and the first bearing support portion 30 of the removable retaining member 40 of the stationary axle 20. Thus, the driver is rotatably disposed about the stationary axle 20 via the first main bearing 52. The pawls 47 serve as a one-way clutch and are supported by the pawl support portion 46 in a conventional manner and therefore description of the pawl 47 is omitted for the sake of brevity.

The hub shell 24 is rotatably disposed about the stationary axle 20 and rotatably disposed about a portion of the driver 22. The hub shell 24 basically includes a first side bearing support portion 60, a second side bearing support portion 62, conventional spoke flanges 64 and 66, pawl gear teeth 68 and clutch pawl gear teeth 70. A second main bearing 72 is disposed between the outer bearing support portion 44 of the driver 22 and the first side bearing support portion 60 of the hub shell 24. Further, a third main bearing 74 is disposed between the second bearing support portion 32 of the removable retaining member 42 and the second side bearing support portion 62 of the hub shell 24. Thus, the hub shell 24 is rotatably disposed about the stationary axle 20 via the third main bearing 74 and rotatably disposed about a portion of the driver 22 via the second bearing support portion 32. Consequently, the hub shell 24 is rotatable about the rotational axis A.

With specific reference to both FIGS. 2 and 4, a description of the shifting mechanism 26 is now provided. In the first embodiment, the shifting mechanism 26 is configured to shift the power transmission mechanism 28 between three power transmission paths that are described in greater detail below. The shifting mechanism 26 basically includes a push rod 80, a shift key 82, a first coil spring 84, a second coil spring 86, a third coil spring 88, a coil spring retainer 90 and a clutch ring 92. The shifting mechanism 26 operates in a manner that corresponds to operation of a conventional shifting mechanism described in U.S. Pat. No. 5,928,103 (assigned to Shimano Inc.). Therefore, description of the shifting mechanism 26 is minimal for the sake of brevity.

The push rod 80 is disposed within the central bore 34 of the stationary axle 20. The push rod 80 is operably coupled to the Bowden-type cable T depicted in FIG. 1 in a conventional manner. Since coupling between the push rod 80 and the Bowden-type cable T is conventional, description is omitted for the sake of brevity. However, when the Bowden-type cable T is moved by actions of a cyclist riding the bicycle 10, the push rod 80 is similarly moved along the rotational axis A causing movement of the shift key 82.

The shift key 82 is preferably a metallic block of material that extends through the pair of elongated openings 36 perpendicular to the rotational axis A and the push rod 80. The shift key 82 is rigidly fixed to one end of the push rod 80 for movement therewith. As the push rod 80 is moved between the positions shown in FIGS. 2 and 8, the shift key 82 rotates about the rotational axis A due to contact with the surfaces of the elongated openings 36. Opposite ends of the shift key 82 extend out of the elongated openings 36 and include projections 82a that engage portions of the clutch ring 92, as described in greater detail below.

As best shown in FIG. 4, the first coil spring 84 is disposed around the push rod 80. As described in U.S. Pat. No. 5,928,103, the first coil spring 84 biases the shift key 82 to move toward the position depicted in FIG. 2. In other words, the first coil spring 84 urges the shift key 82 and push rod 80 to move toward the position depicted in FIG. 2.

As shown in FIG. 2, the second coil spring 86 is disposed about the stationary shaft 20 and is further disposed within the clutch ring 92, as described further below. The third coil spring 88 is disposed about the stationary shaft 20 but is compressed between shift key 82 and the coil spring retainer

90. The coil spring retainer 90 is a cup like member that is fixed to the stationary shaft 20, as shown in FIGS. 2 and 4. Since the third coil spring 88 is confined at one end by the coil spring retainer 90, the third coil spring 88 biases the shift key 82 and the clutch ring 92 to move toward the right side of FIG. 2. In other words, the third coil spring 88 biases the shift key 82 and the clutch ring 92 to move toward the position depicted in FIG. 8.

Figure 8:
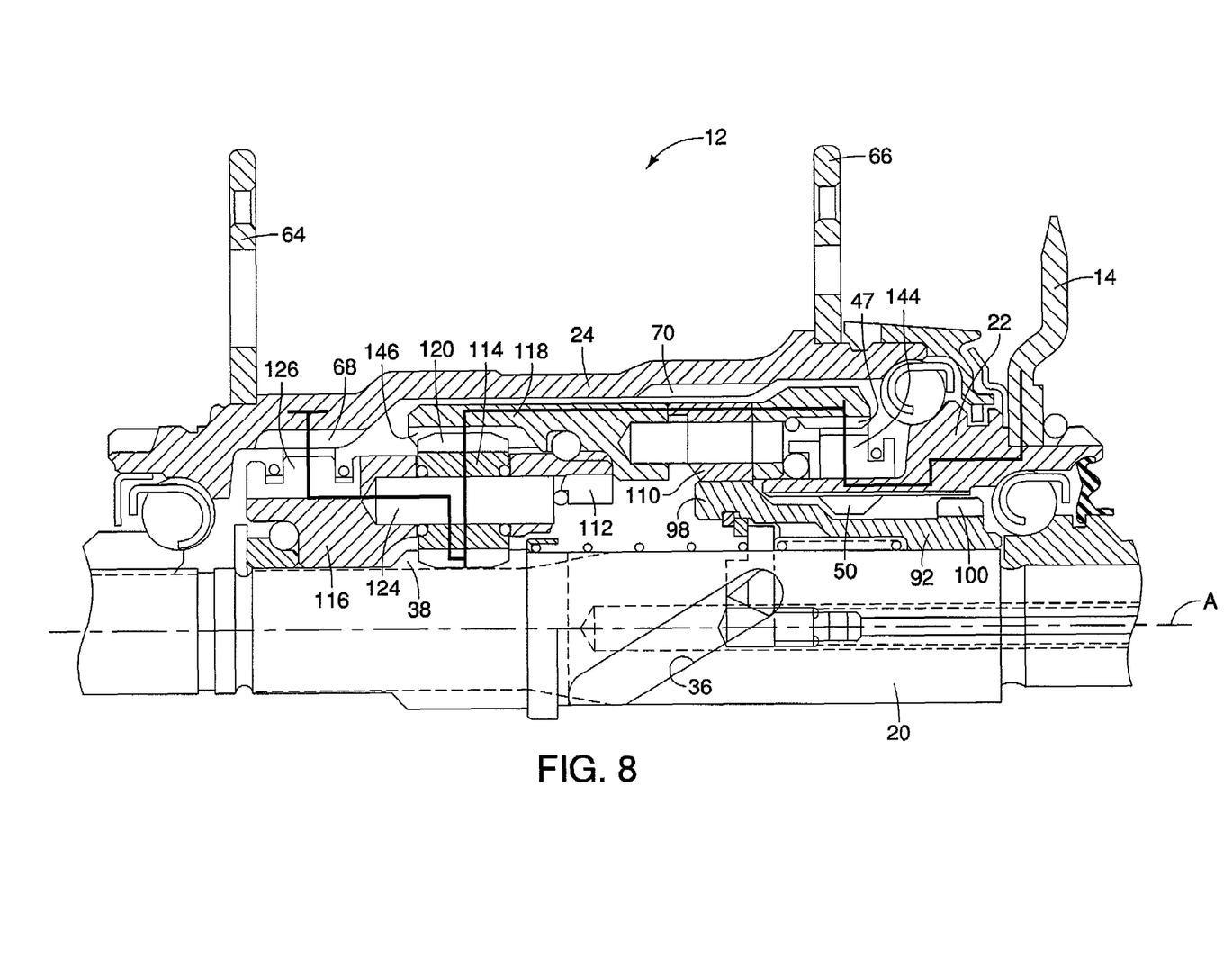
FIG. 8 is a cross-sectional view of the internal hub transmission showing a first power transmission path in accordance with the first embodiment of the present invention.
Figure 9:
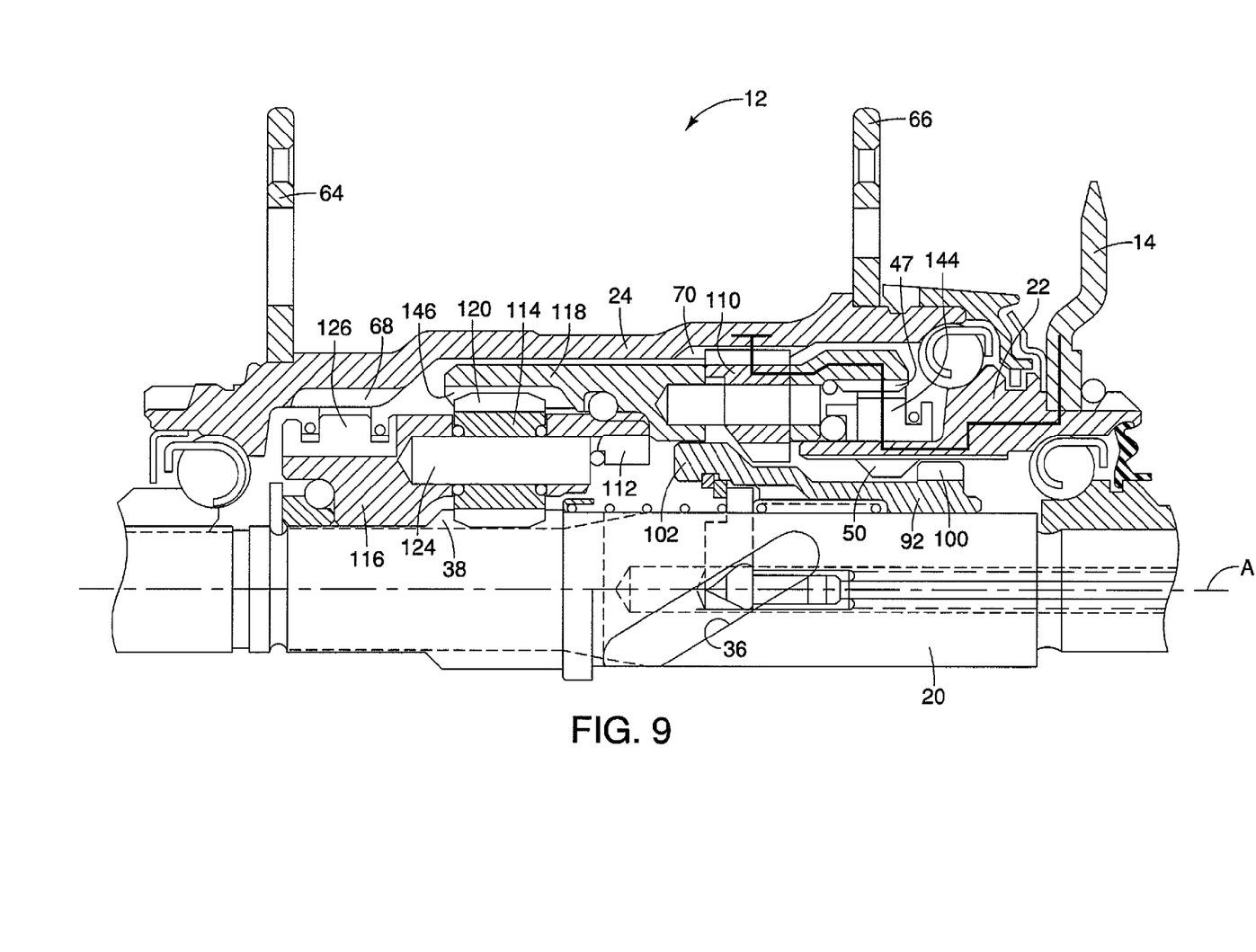
FIG. 9 is another cross-sectional view of the internal hub transmission showing a second power transmission path in accordance with the first embodiment of the present invention.
Figure 10:
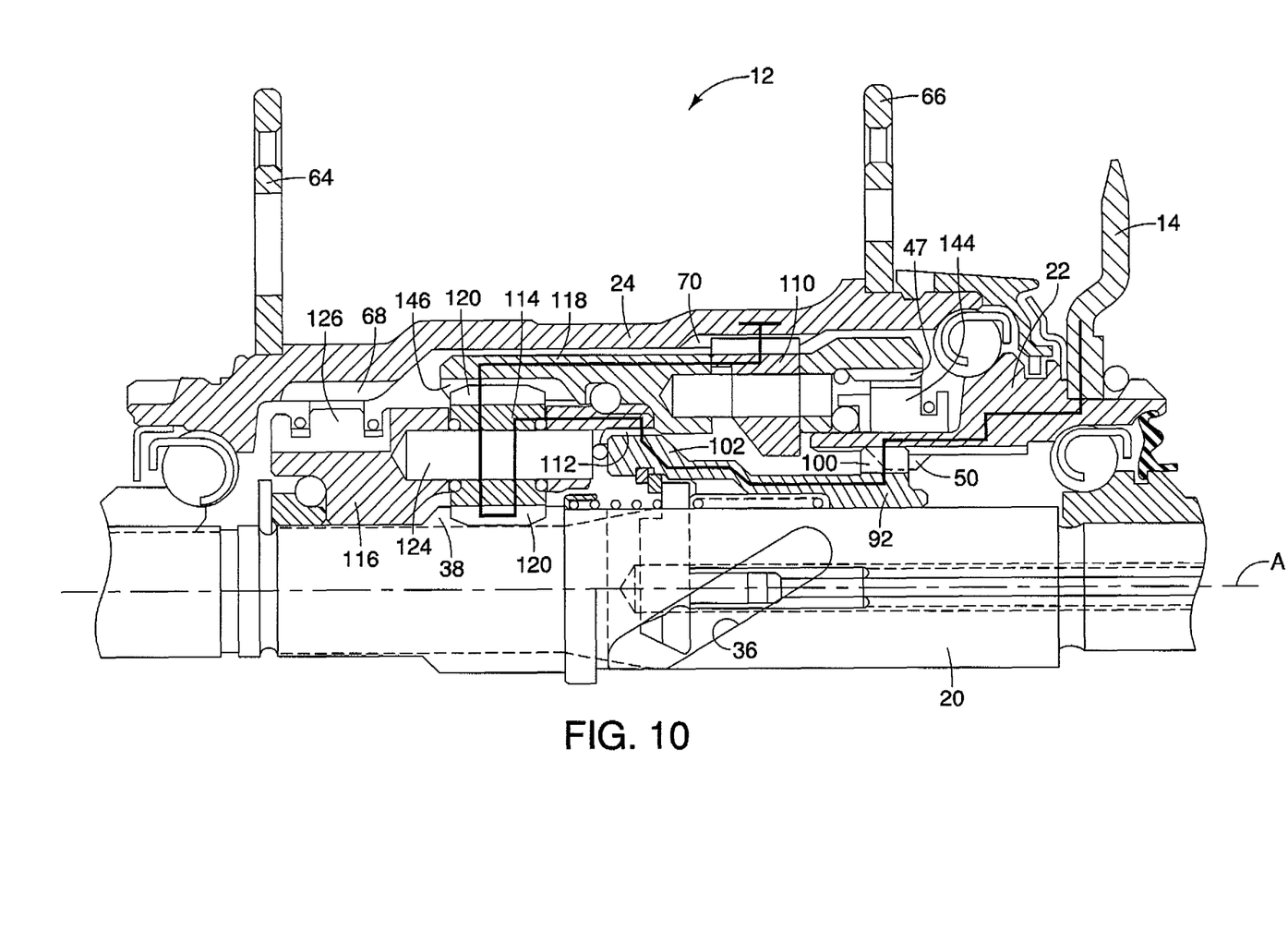
FIG. 10 is a cross-sectional view of the internal hub transmission showing a third power transmission path in accordance with the first embodiment of the present invention.

As shown in FIGS. 2 and 4, the clutch ring 92 is an annular ring shaped member that encircles the stationary axle 20 but is configured to slide along the stationary axle 20 in directions parallel to the rotational axis A. As best shown in FIGS. 8, 9 and 10, the clutch ring 92 is configured to move between a first position shown in FIG. 8, a second position shown in FIG. 9 and a third position shown in FIG. 10. FIG. 8 corresponds to a first power transmission path. FIG. 9 corresponds to a second power transmission path. FIGS. 2 and 10 correspond to a third power transmission path.

As best shown in FIGS. 2 and 4, the clutch ring 92 basically includes internal cam surfaces 94, a spring retaining portion 96 (FIG. 2 only), an external cam surface 98, first gear teeth 100, second gear teeth 102, and a retainer 104.

As best shown in FIG. 2, the internal cam surfaces 94 are configured to contact portions of the shift key 82 for positioning the clutch ring 92 in response to movement of the push rod 80 and the shift key 82, as best described in the above mentioned U.S. Pat. No. 5,928,103. The spring retaining portion 96 retains one end of the second coil spring 86 and the other end of the second coil spring 86 contacts the shift key 82. Consequently, the second coil spring 86 biases the shift key 82 to move toward the left side of FIG. 2 relative to the clutch ring 92. In other words, the second coil spring 86 biases the shift key 82 to move toward and contact the retainer 104. As is described in U.S. Pat. No. 5,928,103, the shift key 82 can move toward the right side of FIG. 2 without initially moving the clutch ring 92. For example, the cyclist may cause the Bowden-type cable T to move, further causing the push rod 80 to move toward the right side of FIG. 2. The shift key 82 can temporarily become spaced apart from the retainer 104 of the clutch ring 92. However, the biasing force of the third coil spring 88 eventually urges the clutch ring 92 to follow the movement of the shift key 82.

Referring again to both FIGS. 2 and 4, the external cam surface 98 is an annular shaped surface having a fixed diameter that is dimensioned to contact a clutch pawl 110 supported on a portion of the power transmission mechanism 28, described in greater detail below. The first gear teeth 100 of the clutch ring 92 are dimensioned to contact and engage the inwardly projecting set of gears 50 of the drive 22 with the clutch ring 92 in the third power transmission path position depicted in both FIGS. 2 and 10. The second gear teeth 102 located adjacent to the external cam surface 98 are dimensioned to contact and engage an inwardly projecting set of gear teeth 112 of the power transmission mechanism 28 with the clutch ring 92 in the third power transmission path position depicted in both FIGS. 2 and 10, as described below.

The retainer 104 of the clutch ring 92 extends radially inward, and is dimension to restrict movement of the shift key 82 along the rotation axis A relative to the clutch ring 92. Specifically, opposite ends of the shift key 82 extend out of the elongated openings 36. The projections 82a further extend radially outward such that one side of the projections 82a can come into contact with the facing surface of the retainer 104 of the clutch ring 92. More specifically, as shown in FIG. 2, the shift key 82 is confined on the left side by the retainer 104 and biased to remain in contact with the retainer 104 by the force of the second coil spring 86. Consequently, when the shift key 82 is moved to the left, the clutch ring 92 also moves to the left in FIG. 2. When the shift key 82 is moved to the right in FIG. 2, the clutch ring 92 is urged to the right by compression of the second coil spring 86.

A description of the power transmission mechanism 28 is now provided with specific reference to FIGS. 2, 3 and 6-10. The power transmission mechanism 28 is disposed between the driver 22 and the hub shell 24 for transmitting rotational power from the driver 22 to the hub shell 24 through the plurality of power transmission paths depicted in FIGS. 8, 9 and 10. The power transmission mechanism basically includes a planetary gear mechanism 113 that includes the sun gear teeth 38 (a sun gear), a plurality of planetary gears 114 supported by a gear rack 116 and a gear ring 118.

Figure 6:
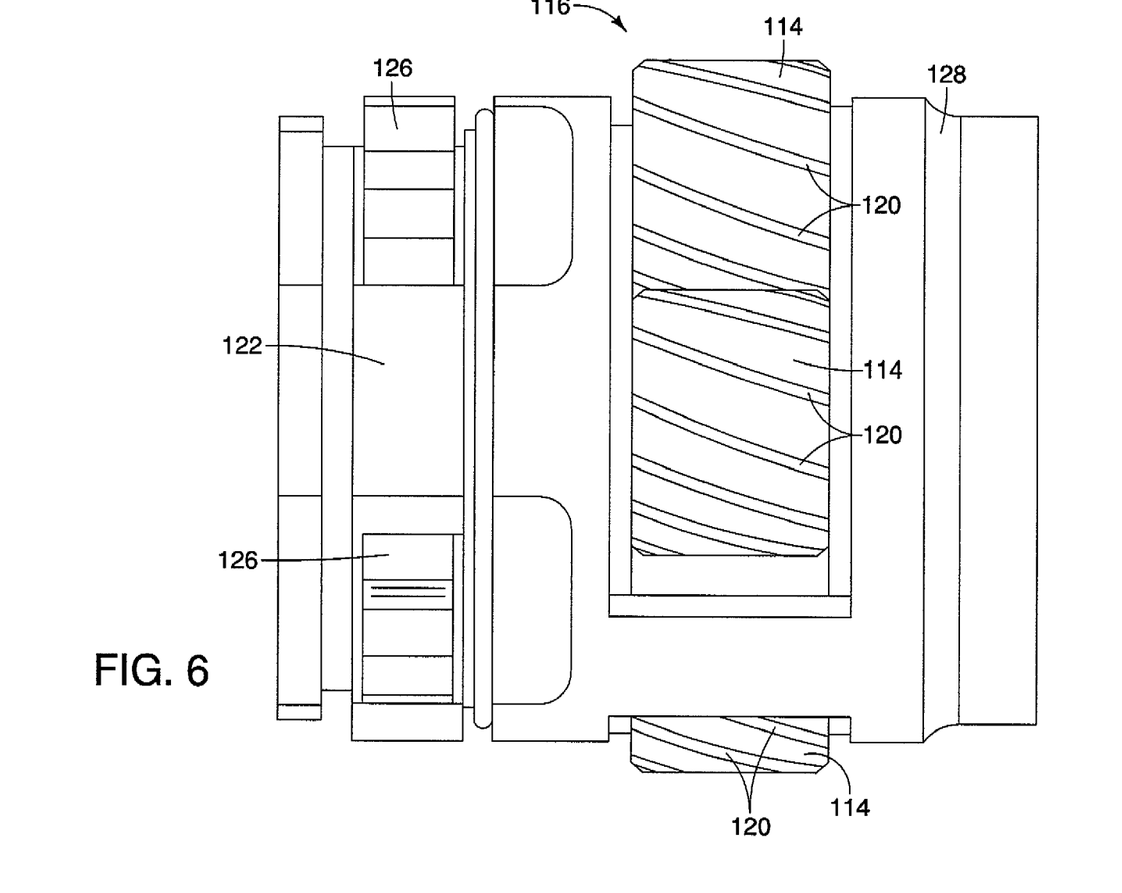
FIG. 6 is a side elevational view of the planet gear carrier shown removed from the hub axle in accordance with the first embodiment of the present invention.

In FIG. 6, three of four of the plurality of planetary gears 114 are depicted rotatably supported by the gear rack 116. However, it should be understood that although four planetary gears 114 are included in the present invention, two, three, four or five planetary gears 114 or any other design appropriate number of planetary gears can be employed. As shown in FIG. 6, the planetary gears 114 include helical gear teeth 120. The helical gear teeth of the planetary gears 114 are shaped to mesh with the sun gear teeth 38 of the stationary axle 20 and the sun gear teeth 38 are shaped to mesh with the helical gear teeth 120 of the planetary gears 114.

As indicated in FIGS. 2, 6 and 8-10, the gear rack 116 is an annular shaped member that is rotatably disposed about the stationary axle 20 for rotation about the rotational axis A. As shown in FIG. 6, the gear rack 116 is a planetary gear support member that includes a pawl support portion 122, a plurality of shafts 124 (only one depicted in FIGS. 2 and 8-10, not visible in FIG. 6), a plurality of pawls 126 (only one depicted in FIG. 2 and two depicted in FIG. 6) an outer bearing support portion 128, an inner bearing support portion 130 (shown in FIG. 2) and the above mentioned inwardly projecting set of gear teeth 112 (shown best in FIG. 8).

The shafts 124 are provided with a two sets of bearings 132 that support the planetary gears 114 such that the planetary gears 114 are smoothly rotatable about respective ones of the shafts 124. The bearings 132 can be any of a variety of bearing configurations, such as ball bearings, but can alternatively be needle bearings or other roller type bearings. Since the gear rack 116 rotates about the stationary axle 20, the planetary gears 114 rotate about the shafts 124, mesh with the sun gear teeth 38 thereby further revolving about the stationary axle 20. Since the pawls 126 are conventional elements, description of the pawls 126 is omitted for the sake of brevity. The inner gear teeth 112 are configured to mesh with the second gear teeth 102 of the clutch ring 92 when the clutch ring is in the third power transmission path position depicted in FIGS. 2 and 10.

Figure 7:
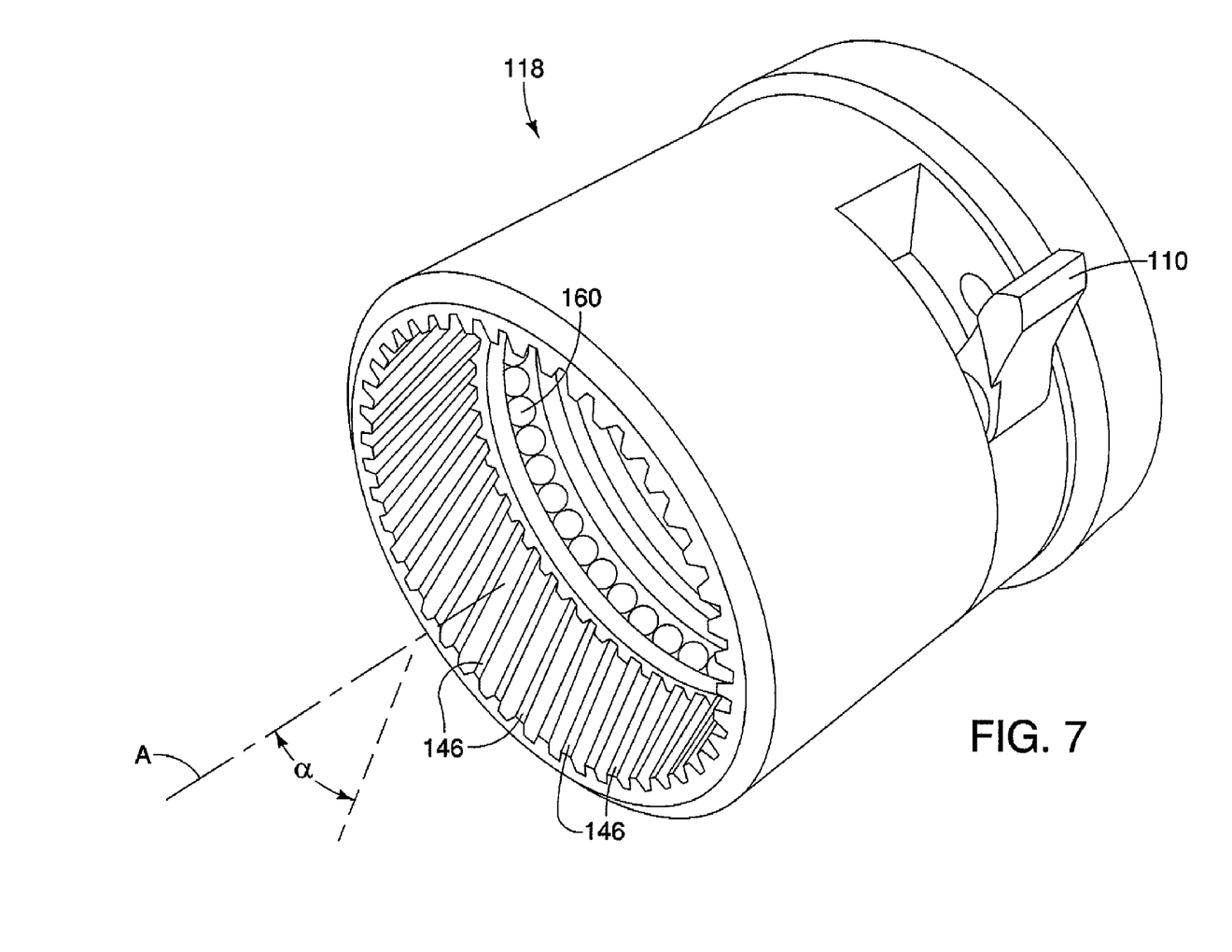
FIG. 7 is a perspective view of the ring gear shown removed from the hub axle in accordance with the first embodiment of the present invention.

As shown in FIG. 7, the gear ring 118 of the planetary gear mechanism 113 is an annular member that supports the clutch pawls 110 and is configured to rotate about the stationary axle 20, the gear rack 116 and hence the planet gears 114. The gear ring 118 includes a first bearing support portion 140, a second bearing support portion 142, a set of pawl gear teeth 144 (FIG. 2 only) and a set of helical gear teeth 146 (FIGS. 2 and 7). The pawl gear teeth 144 are configured to operate with the pawl 47 in a conventional manner. The helical gear teeth 146 are shaped and dimensioned to mesh with the helical gear teeth 120 of the planetary gears 114. Hence, the planetary gear 114 has helical gear teeth 120, the stationary axle 20 has sun gear teeth 38 that are helical (the sun gear) and the gear ring 118 has helical gear teeth 146. The helical gear teeth 120, the sun gear teeth 38 and the helical gear teeth 146 all have a helical shape that defines helix angle α measured relative to the rotation axis A, as indicated in FIG. 7. The helix angle α is approximately 20 degrees measured relative to the rotation axis A.

The present invention includes a plurality of bearing assemblies to ensure smooth rotation of the various parts. The second bearing support portion 142 of the gear ring 118 and the outer bearing support portion 128 of the gear rack 116 include a first bearing assembly 160 that ensures smooth rotation between the gear rack 116 and the gear ring 118. The first bearing support portion 140 and the ring gear bearing support portion 48 of the driver 22 include a second bearing assembly 162 that ensures smooth rotation between the driver 22 and the gear ring 118. In the appended claims, the bearings 132 that support the planetary gears 114 on the shafts 124 of the gear rack 116 define third bearing assemblies. The inner bearing support portion 130 of the gear rack 116 includes a fourth bearing assembly 170 that ensures smooth rotation between stationary axle 20 and the gear rack 116.

A description of the various power transmission paths of the depicted embodiment are shown more clearly in FIGS. 8, 9 and 10. Specifically, in each of FIGS. 8, 9 and 10, the power transmission paths are shown in thick lines. For example, in FIG. 8, the first power transmission path is depicted (a low speed gear ratio). In the first power transmission path, the clutch ring 92 has been shifted to the first power transmission path position (to the right side of FIG. 8) by actions of the cyclist controlling the bicycle 10. In the first power transmission path position, the external cam surface 98 of the clutch ring 92 contacts an inward portion of the clutch pawls 110 of the gear ring 118. The contact between the external cam surface 98 of the clutch ring 92 and the clutch pawls 110 draws the clutch pawls 110 radially inward such that the clutch pawls 110 cannot contact the clutch pawl gear teeth 70 of the hub shell 24. Hence, power is transmitted from the rear chain sprocket 14 to the driver 22. The pawls 47 on the driver 22 engage the pawl gear teeth 144 of the gear ring 118 causing the gear ring 118 to rotate with the driver 22. The helical gear teeth 146 of the gear ring 118 mesh with the helical gear teeth 120 of the planetary gears 114. The helical gear teeth 120 of the planetary gears 114 are further meshed with the sun gear teeth 38 of the stationary axle 20 such that the planetary gears 114 rotate about the stationary axle 20. The shafts 124 that support the planetary gears 114 are caused to rotate along with the gear rack 116. Rotation of the gear rack 116 causes the pawls 126 to engage the pawl gear teeth 68 of the hub shell 24 and hence rotate the hub shell 24. Since the rear wheel W is supported by the spoke flanges 64 and 66, the rear wheel W then rotates at the low speed of the first power transmission path.

In FIG. 9, the second power transmission path is depicted (a medium or direct speed gear ratio). In the second power transmission path, the clutch ring 92 has been shifted to the second power transmission path position (to a central position in FIG. 9) by actions of the cyclist controlling the bicycle 10. In the second power transmission path position, the external cam surface 98 of the clutch ring 92 no longer contact the clutch pawls 110 of the gear ring 118. Hence, the clutch pawls 110 are free to contact the clutch pawl gear teeth 70 of the hub shell 24. Hence, power is transmitted from the rear chain sprocket 14 to the driver 22. The pawls 47 on the driver 22 engage the pawl gear teeth 144 of the gear ring 118 causing the gear ring 118 to rotate with the driver 22. The clutch pawls 110 engage the gear teeth 70 causing rotation of the hub shell 24. Since the rear wheel W is supported by the spoke flanges 64 and 66, the rear wheel W then rotates along the second power transmission path. In the second power transmission path, the pawls 126 ratchet because the hub shell 24 is rotating faster than the gear rack 116.

In FIG. 10, the third power transmission path is depicted (a fast speed gear ratio). In the third power transmission path, the clutch ring 92 has been shifted to the third power transmission path position (to the left side of FIG. 10) by actions of the cyclist controlling the bicycle 10. In the third power transmission path position, the external cam surface 98 of the clutch ring 92 no longer contact the clutch pawls 110 of the gear ring 118. Hence, the clutch pawls 110 are free to contact the clutch pawl gear teeth 70 of the hub shell 24. Further with the clutch ring 92 in the third power transmission path position, the second gear teeth 102 of the clutch ring 92 are now meshed with the inwardly projecting set of gear teeth 112 of the gear rack 116 and the first gear teeth 100 of the clutch ring 92 are meshed with the inwardly projecting set of gears 50 of the driver 22. Hence, power is transmitted from the rear chain sprocket 14 to the driver 22. The pawls 47 on the driver 22 ratchet with respect to the pawl gear teeth 144 of the gear ring 118 because the gear ring 118 is rotating faster than the driver 22. Instead, torque is transmitted from the inwardly projecting set of gears 50 of the driver 22 to the first gear teeth 100 of the clutch ring 92. The second gear teeth 102 of the clutch ring 92 transmit torque to the inwardly projecting set of gear teeth 112 of the gear rack 116, causing the gear rack 116 to rotate.

Since the gear rack 116 is rotating, the shafts 124 rotate causing the helical gear teeth 120 of the planetary gears 114 about the stationary axle 20. The rotation of the planetary gears 114 further causes rotation of the gear ring 118. The clutch pawls 110 of the gear ring 118 engage the gear teeth 70 causing rotation of the hub shell 24. Since the rear wheel W is supported by the spoke flanges 64 and 66, the rear wheel W then rotates along the third power transmission path. In the third power transmission path, the pawls 126 ratchet because the hub shell 24 is rotating faster than the gear rack 116.

The helical shaped gear teeth of the present invention (the helical gear teeth 120, the sun gear teeth 38 and helical gear teeth 146 help to realize many benefits over prior internal hub transmission designs. For instance, the helical gears increase efficiency of gear meshing (and hence of power transmission) between the sun gear 38 and the planetary gears 114, and between the planetary gears 114 and the ring gear 118. The helical shaped gear teeth also reduce stress that would otherwise be present by at the ends of spur-type gear teeth.

It should be understood from the drawings and the description herein, that helical gear teeth and the associated bearing configurations described above can be applied to internal hub transmission assemblies having more than three power transmission paths, such as, for example, in a second embodiment described below.

Second Embodiment

Figure 11:
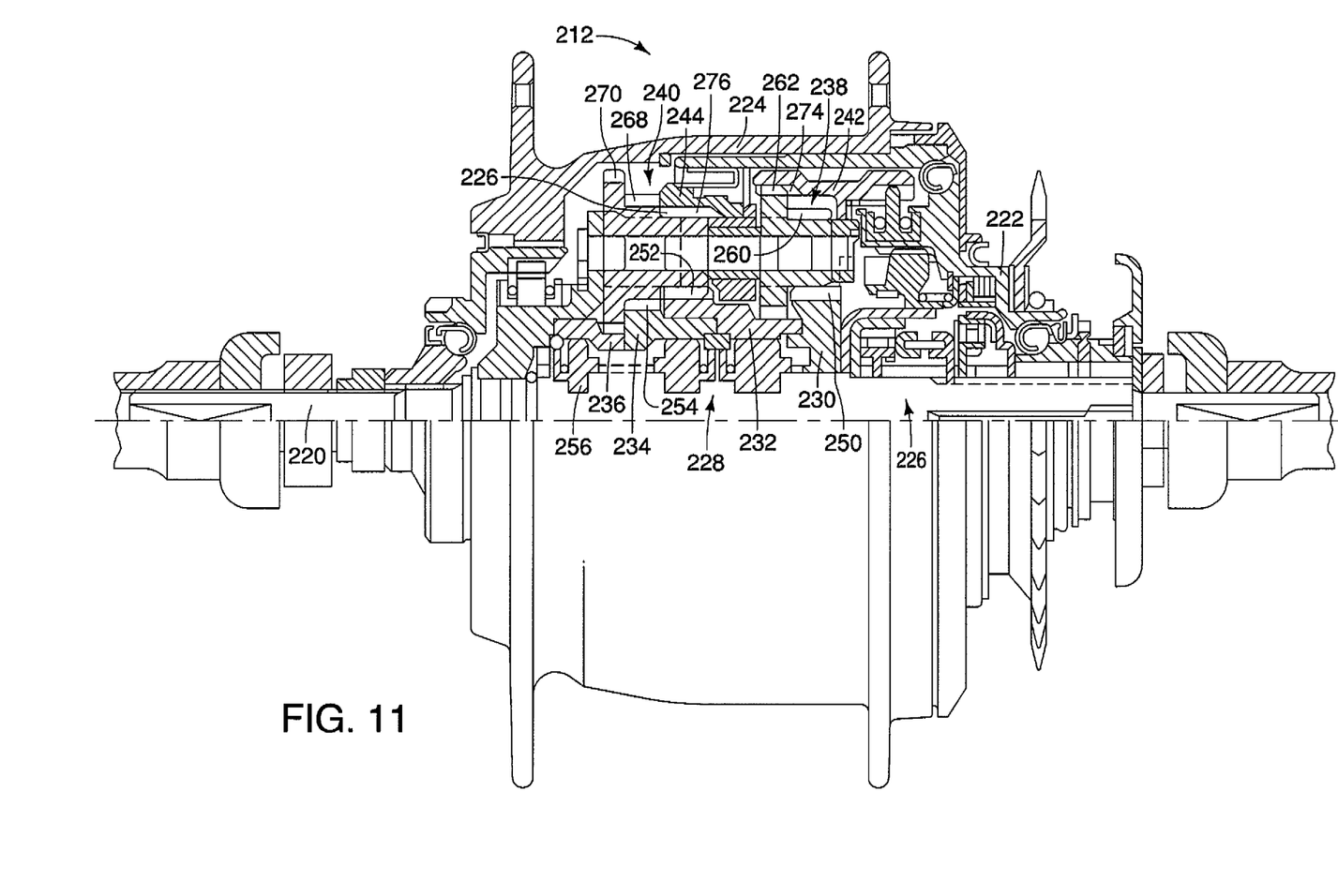
FIG. 11 is a cross-sectional view of the internal hub transmission showing a second embodiment of the present invention.

Referring now to FIG. 11, a hub assembly 212 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The hub assembly 212 has many features that are the same as in U.S. Pat. No. 6,607,465 (assigned to Shimano Inc.). Further, the hub assembly 212 shifts and transmits torque in a manner that is consistent with the device described in U.S.

Pat. No. 6,607,465. Therefore, description of the shifting and power transmission paths of the hub assembly 212 is omitted for the sake of brevity.

The hub assembly 212 basically includes (among other features and elements) a stationary axle 220, a driver 222, a hub shell 224, a shifting mechanism 226 and a power transmission mechanism 228.

The driver 222 and the hub shell 224 are configured to rotate about the stationary axle 220. The power transmission mechanism 228 is configured to transmit torque from the driver 222 to the hub shell 224 via a plurality of power transmission paths. The power transmission mechanism 228 includes (among other things) a first sun gear 230, a second sun gear 232, a third sun gear 234, a forth sun gear 236, a first set of planetary gears 238, a second set of planetary gears 240, a first ring gear 242 and a second ring gear 244.

The first sun gear 230 has a first set of outer gear teeth 250. The second sun gear 232 has a second set of outer gear teeth 252. The third sun gear 234 has a third set of outer gear teeth 254. The forth sun gear 236 has a fourth set of outer gear teeth 256.

The first set of planetary gears 238 includes a small diameter set of gear teeth 260 and a large diameter set of gear teeth 262.

The second set of planetary gears 240 includes a small diameter set of gear teeth 266, a mid-size diameter set of gear teeth 268 and a large diameter set of gear teeth 270.

The first ring gear 242 includes a first set of inner gear teeth 274 and the second ring gear 244 includes a second set of inner gear teeth 276.

The first set of outer gear teeth 250 of the first sun gear 230 are configured to mesh with the small diameter set of gear teeth 260 of the first set of planetary gears 238.

The second set of outer gear teeth 252 of the second sun gear 232 are configured to mesh with the small diameter set of gear teeth 266 of the second set of planetary gears 240. The small diameter set of gear teeth 266 of the second set of planetary gears 240 are configured to mesh with the second set of inner gear teeth 276 of the second ring gear 244.

The third set of outer gear teeth 254 of the third sun gear 234 are configured to mesh with the mid-size diameter set of gear teeth 268 of the second set of planetary gears 240.

The fourth set of outer gear teeth 256 of the forth sun gear 236 are configured to mesh with the large diameter set of gear teeth 270 of the second set of planetary gears 240.

Depending upon the specific configuration of the hub assembly 212 and any of variety of design criteria, various sets of the gears can be provided with helical gear teeth to replace spur teeth. For example, the first set of outer gear teeth 250 of the first sun gear 230 and the small diameter set of gear teeth 260 of the first set of planetary gears 238 can be formed as helical gear teeth.

Additionally or alternatively, the large diameter set of gear teeth 262 of the first set of planetary gears 238 and the first gear teeth 274 of the first ring gear 242 can be formed as helical gear teeth.

Additionally or alternatively, the second set of outer gear teeth 252 of the second sun gear 232, the small diameter set of gear teeth 266 of the second set of planetary gears 240 and the second set of inner gear teeth 276 of the second ring gear 244 can be formed as helical gear teeth.

Additionally or alternatively, the third set of outer gear teeth 254 of the third sun gear 234 and the mid-size diameter set of gear teeth 268 of the second set of planetary gears 240 can be formed as helical gear teeth.

Additionally or alternatively, the fourth set of outer gear teeth 256 of the forth sun gear 236 and the large diameter set of gear teeth 270 of the second set of planetary gears 240 can be formed as helical gear teeth.

The helical gear teeth employed in the second embodiment provide the same benefits and advantages of the first embodiment.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An internal hub transmission comprising:
   a hub axle;
   a driver rotatably supported by the hub axle;
   a hub shell rotatably supported by the hub axle;
   a power transmission mechanism disposed between the driver and the hub shell for transmitting rotational power from the driver to the hub shell through a plurality of power transmission paths, the power transmission mechanism having at least one planetary gear mechanism that includes a sun gear, a planetary gear and a ring gear, the planetary gear being supported by a gear rack, the planetary gear having helical gear teeth and at least one of the sun gear and the ring gear being provided with helical gear teeth that mesh to the helical gear teeth of the planetary gear,
   the power transmission mechanism further having a first ball bearing assembly operably disposed between the gear rack and the ring gear to support smooth rotation therebetween; and
   a shift mechanism for selecting one of the plurality of power transmission paths.

2. The internal hub transmission according to claim 1, wherein
   the sun gear includes the helical gear teeth that mesh with the helical gear teeth of the planetary gear.

3. The internal hub transmission according to claim 1, wherein
the ring gear includes the helical gear teeth that mesh with the helical gear teeth of the planetary gear.

4. The internal hub transmission according to claim 3, wherein
the sun gear also includes helical gear teeth that mesh with the helical gear teeth of the planetary gear.

5. The internal hub transmission according to claim 1, wherein
the sun gear is formed on an exterior surface of the hub axle.

6. An internal hub transmission comprising:
a hub axle;
a driver rotatably supported by the hub axle;
a hub shell rotatably supported by the hub axle;
a power transmission mechanism disposed between the driver and the hub shell for transmitting rotational power from the driver to the hub shell through a plurality of power transmission paths, the power transmission mechanism having at least one planetary gear mechanism that includes a sun gear, a planetary gear and a ring gear, the planetary gear being supported by a gear rack, the planetary gear having helical gear teeth and at least one of the sun gear and the ring gear being provided with helical gear teeth that mesh to the helical gear teeth of the planetary gear,
the power transmission mechanism further having a second ball bearing assembly operably disposed between the driver and the ring gear to support smooth rotation therebetween; and
a shift mechanism for selecting one of the plurality of power transmission paths.

7. The internal hub transmission according to claim 6, wherein
the sun gear includes the helical gear teeth that mesh with the helical gear teeth of the planetary gear.

8. The internal hub transmission according to claim 6, wherein
the ring gear includes the helical gear teeth that mesh with the helical gear teeth of the planetary gear.

9. The internal hub transmission according to claim 8, wherein
the sun gear also includes helical gear teeth that mesh with the helical gear teeth of the planetary gear.

10. The internal hub transmission according to claim 6, wherein
the sun gear is formed on an exterior surface of the hub axle.

11. An internal hub transmission comprising:
a hub axle;
a driver rotatably supported by the hub axle;
a hub shell rotatably supported by the hub axle;
a power transmission mechanism disposed between the driver and the hub shell for transmitting rotational power from the driver to the hub shell through a plurality of power transmission paths, the power transmission mechanism having at least one planetary gear mechanism that includes a sun gear, a planetary gear and a ring gear, the planetary gear being supported by a gear rack, the planetary gear having helical gear teeth and at least one of the sun gear and the ring gear being provided with helical gear teeth that mesh to the helical gear teeth of the planetary gear,
the power transmission mechanism further having a third ball bearing assembly operably disposed between the gear rack and the planetary gear to support smooth rotation therebetween; and
a shift mechanism for selecting one of the plurality of power transmission paths.

12. The internal hub transmission according to claim 11, wherein
the sun gear includes the helical gear teeth that mesh with the helical gear teeth of the planetary gear.

13. The internal hub transmission according to claim 11, wherein
the ring gear includes the helical gear teeth that mesh with the helical gear teeth of the planetary gear.

14. The internal hub transmission according to claim 13, wherein
the sun gear also includes helical gear teeth that mesh with the helical gear teeth of the planetary gear.

15. The internal hub transmission according to claim 11, wherein
the sun gear is formed on an exterior surface of the hub axle.

16. An internal hub transmission comprising:
a hub axle;
a driver rotatably supported by the hub axle;
a hub shell rotatably supported by the hub axle;
a power transmission mechanism disposed between the driver and the hub shell for transmitting rotational power from the driver to the hub shell through a plurality of power transmission paths, the power transmission mechanism having at least one planetary gear mechanism that includes a sun gear, a planetary gear and a ring gear, the planetary gear being supported by a gear rack, the planetary gear having helical gear teeth and at least one of the sun gear and the ring gear being provided with helical gear teeth that mesh to the helical gear teeth of the planetary gear,
the power transmission mechanism further having a fourth ball bearing assembly operably disposed between the gear rack and the hub axle to support smooth rotation therebetween; and
a shift mechanism for selecting one of the plurality of power transmission paths.

17. The internal hub transmission according to claim 16, wherein
the sun gear includes the helical gear teeth that mesh with the helical gear teeth of the planetary gear.

18. The internal hub transmission according to claim 16, wherein
the ring gear includes the helical gear teeth that mesh with the helical gear teeth of the planetary gear.

19. The internal hub transmission according to claim 18, wherein
the sun gear also includes helical gear teeth that mesh with the helical gear teeth of the planetary gear.

20. The internal hub transmission according to claim 16, wherein
the sun gear is formed on an exterior surface of the hub axle.

* * * * *